US010284625B2

(12) United States Patent
Brownell et al.

(10) Patent No.: US 10,284,625 B2
(45) Date of Patent: May 7, 2019

(54) REMOTE DOWNLOAD OF CONTENT TO CONSOLES

(71) Applicants: Jason Brownell, San Francisco, CA (US); Chandrashekar Hassan Raju, Sunyvale, CA (US); Tom Nelson, San Francisco, CA (US); Sugiharto Widjaja, San Jose, CA (US)

(72) Inventors: Jason Brownell, San Francisco, CA (US); Chandrashekar Hassan Raju, Sunyvale, CA (US); Tom Nelson, San Francisco, CA (US); Sugiharto Widjaja, San Jose, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 218 days.

(21) Appl. No.: 14/248,740

(22) Filed: Apr. 9, 2014

(65) Prior Publication Data
US 2015/0180935 A1 Jun. 25, 2015

Related U.S. Application Data

(60) Provisional application No. 61/920,647, filed on Dec. 24, 2013.

(51) Int. Cl.
*G06F 3/00* (2006.01)
*H04L 29/08* (2006.01)
(Continued)

(52) U.S. Cl.
CPC .......... *H04L 67/06* (2013.01); *A63F 13/35* (2014.09); *A63F 13/69* (2014.09); *A63F 13/73* (2014.09); *H04L 63/08* (2013.01); *H04L 63/168* (2013.01); *H04N 21/25875* (2013.01); *H04N 21/41407* (2013.01); *H04N 21/4227* (2013.01); *H04N 21/4781* (2013.01); *H04N 21/482* (2013.01);
(Continued)

(58) Field of Classification Search
USPC .................................. 715/739, 733, 748, 749
See application file for complete search history.

(56) References Cited

U.S. PATENT DOCUMENTS 6,507,727 B1 * 1/2003 Henrick ................. G06Q 30/06
  348/E7.071
7,465,231 B2  12/2008 Lewin
(Continued)

OTHER PUBLICATIONS

Jun Ma et al., Device Management in the IMS, Feb. 29, 2008, Springer Science & Business Media, Edition or vol. 16, pp. 46-62 (Year: 2008).*
(Continued)

*Primary Examiner* — Tam T Tran
(74) *Attorney, Agent, or Firm* — Trellis IP Law Group, PC

(57) ABSTRACT

Embodiments generally relate to providing a method for remote download of content to a console. In one embodiment, the method comprises providing a web interface to a user on a display screen of a computing device, The web interface is configured to authenticate the user; display to the user a list of all items of content currently available for download by the user; accept input from the user selecting a first item of content from the list; and initiate download of the selected first item to a console registered to the user.

21 Claims, 5 Drawing Sheets

(51) Int. Cl.

| | | |
|---|---|---|
| H04L 29/06 | (2006.01) | |
| A63F 13/35 | (2014.01) | |
| A63F 13/69 | (2014.01) | |
| A63F 13/73 | (2014.01) | |
| H04N 21/258 | (2011.01) | |
| H04N 21/414 | (2011.01) | |
| H04N 21/4227 | (2011.01) | |
| H04N 21/478 | (2011.01) | |
| H04N 21/482 | (2011.01) | |

(52) U.S. Cl.
CPC ........ *H04L 29/06* (2013.01); *H04L 29/08072* (2013.01)

(56) References Cited

U.S. PATENT DOCUMENTS

| | | |
|---|---|---|
| 7,987,238 B2 | 7/2011 | Hook |
| 2002/0002510 A1 | 1/2002 | Sharp |
| 2004/0266529 A1 | 12/2004 | Chatani |
| 2006/0168123 A1* | 7/2006 | Krstulich ............. H04L 63/083 709/219 |
| 2007/0288967 A1* | 12/2007 | Candelore ............. H04N 5/913 725/50 |
| 2008/0065782 A1* | 3/2008 | Jones ............... G06F 17/30058 709/240 |
| 2008/0244033 A1* | 10/2008 | Hook ............... G06F 17/30017 709/217 |
| 2008/0289006 A1* | 11/2008 | Hock ..................... H04L 63/08 726/4 |
| 2009/0099864 A1* | 4/2009 | Cronrath .................. G06F 8/60 705/2 |
| 2012/0021838 A1 | 1/2012 | Ostergren |
| 2012/0233031 A1* | 9/2012 | Chang ............. G06F 17/30017 705/27.1 |

OTHER PUBLICATIONS

Aysegul Altin et al., Intra-domain traffic engineering with shortest path routing protocols, Jan. 9, 2013, Springer Scence & Business Media, Edition or vol. 204, pp. 65-95 (Year: 2013).*

* cited by examiner

REMOTE DOWNLOAD OF CONTENT TO CONSOLES

CROSS REFERENCES TO RELATED APPLICATIONS

This application claims priority from U.S. Provisional Patent Application Ser. No. 61/920,647, entitled REMOTE DOWNLOAD, filed on Dec. 24, 2013, which is hereby incorporated by reference as if set forth in full in this application for all purposes.

BACKGROUND

Users of consoles are generally eager to play newly acquired content, such as game-related content or recently released movies for example, as quickly as possible following acquisition of that content. Currently available options involve two separate series of steps, the first series involving actions that the user must carry out online, interacting with the entity with overriding rights to the content, and the second series involving actions that the user must carry out at the console to complete the download. Only after all these steps have been carried out can the user enjoy the experience offered by the newly downloaded content.

SUMMARY

Embodiments generally relate to providing a method for remote download of content to consoles, for example, gaming devices. In one embodiment, the method comprises providing a web interface to a user on a display screen of a computing device, The web interface is configured to authenticate the user, display to the user a list of all items of content currently available for download by the user, accept input from the user selecting an item of content from the list, and initiate download of the selected item to a console registered to the user.

In another embodiment, a web interface is provided to a user on a display screen of a computing device, the web interface being configured to authenticate the user, display to the user a list of all items of content currently available for download by the user, accept input from the user selecting an item of content from the list, and initiate download of the selected item to a console registered to the user.

In another embodiment, a non-transitory storage medium is provided, the medium including one or more instructions executable by a processor for providing a web interface to a user on a display screen of a computing device. The web interface is configured to authenticate the user, display to the user a list of all items of content currently available for download by the user, accept input from the user selecting an item of content from the list, and initiate download of the selected item to a console registered to the user.

DETAILED DESCRIPTION

Embodiments described herein enable a user to quickly and easily have a purchased item of content installed on a corresponding console, such as a gaming device. Embodiments generally relate to providing on a display screen of a computing device a web interface, which may be the same web interface used to purchase or rent content, that allows the authenticated user to select the user-owned or user-rented content to be downloaded to a console registered to that user, and then carries out the download of that content automatically, without requiring any further actions to be carried by the user on the console itself. Examples of typical content for download include games, game add-ons, movies, TV or radio shows, and videos.

These benefits may be especially valuable to users purchasing items of content when located remotely from the user's console or consoles, Consider, for example, a user browsing available games on a smartphone, at a lunch-break or while traveling home from school or work. If the user can not only purchase a game on a web store accessed by the smartphone, which is already possible, but can at the same time also request that game to be downloaded to the user's game console at home, the user could be confident that on reaching home that evening the game would be downloaded and will show up on the display screen of the game console as being ready to play.

In some embodiments, the automatic download of the same item of content may be carried out to more than one console registered to the user, for example to a portable game player or device and to a fixed game console.

In some embodiments, the web interface allows the user to conveniently view all the content purchased or otherwise acquired by the user from the corresponding web store and thus available for download as and when desired. The user may select all or a subset of those items for download, decide on the order in which items are to be downloaded, and then request that download be initiated. The remaining steps for a full download of the selected items to the console will occur automatically, without requiring any further actions to be carried by the user on the console itself.

The main issue addressed by embodiments of the current invention is the time-consuming inconvenience for the user, who is currently required to first purchase or rent an item of content from a web store, that acquisition requiring authentication, and then access the user's console, sign in to that device if not already signed in there, navigate through the device's interface to find a record of the purchased item, request download, and then wait for download to complete before, if the item is a game that requires installation, performing that installation. The current invention allows the user to request download of the item while still online with the web store and eliminates the need for the user to be actively involved in additional authentication or in carrying out the download at the console.

Figure 1:
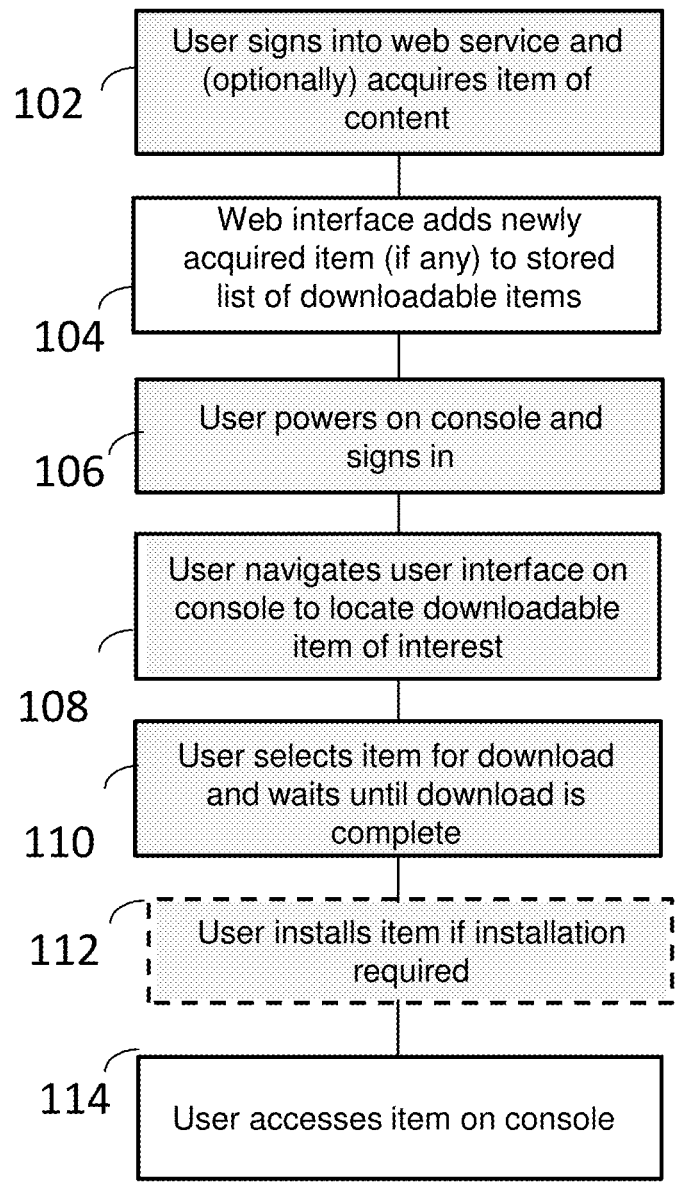
FIG. 1 is a flowchart illustrating the basic steps required to download content purchased online to a console prior to the current invention.

FIG. 1 is a flowchart illustrating the basic steps required, prior to the current invention, to download and install content acquired online to a console. At step 102, a user signs into a web service using a web interface on a computing device that may be a desktop computer, a laptop, or a portable computing device such as a tablet or smartphone. The user optionally purchases or rents an item of content from a web store offered by the web service. In some cases, the user may simply sign in, having acquired the item of interest on a previous occasion. At step 104, the web interface adds the item, if newly acquired, to a list of items already acquired by the user and available for download. If the item of interest was previously acquired, the list will include that previously acquired item. If no other items were previously acquired by the user, the list will contain just the sole newly acquired item. At step 106, the user powers up a console and signs in (e.g. to the users gaming account). At step 108, the user navigates through the user interface on the console to locate the list of items available for download. At step 110, the user selects the item of interest to be downloaded, and waits until download is complete. In cases where the item is a game or other content requiring an installation process, the user must first carry out step 112, installing the game, before reaching step 114. Then, at step 114, if the item is not a game requiring installation, the user may access and finally enjoy the experience of consuming or interacting with the item. All the steps involving active user input are shown shaded in FIG. 1.

Figure 2:
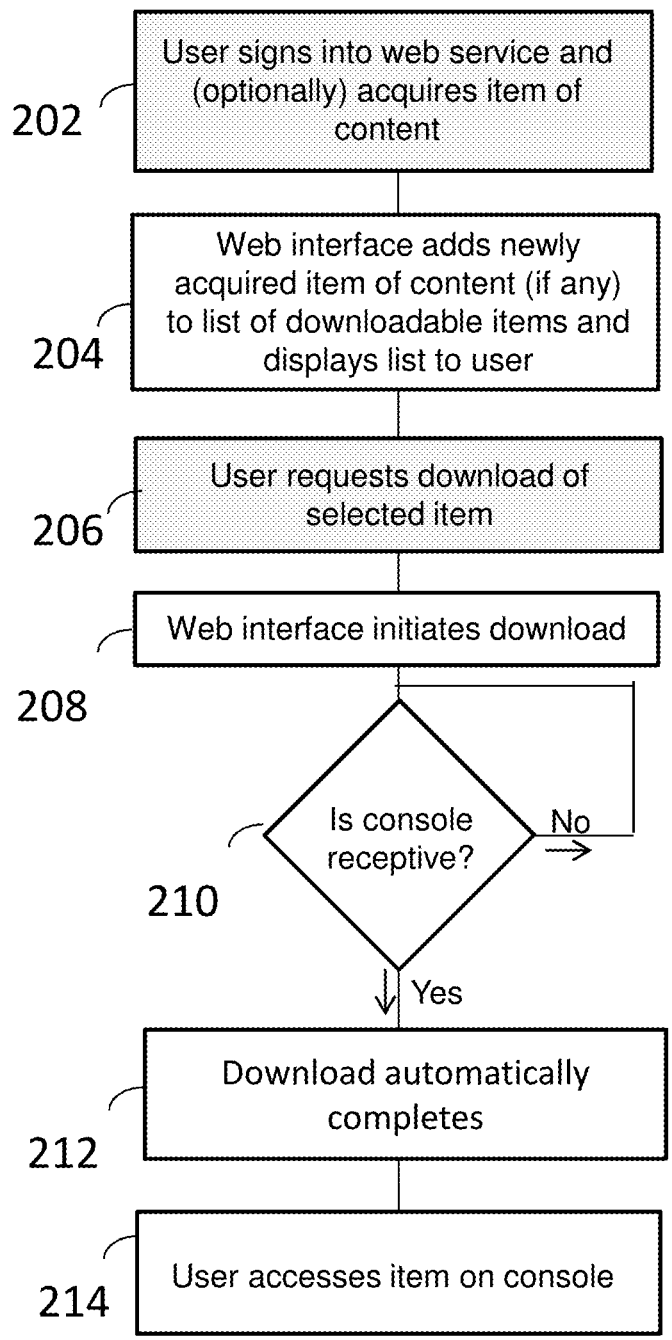
FIG. 2 is a flowchart illustrating the basic steps required to download and install content purchased online to a console, according to some embodiments of the current invention.

FIG. 2 is a flowchart illustrating the basic steps required to download and install content acquired online to a console, for example, a gaming device, according to some embodiments of the current invention. At step 202, a user signs into a web service using a web interface on a computing device, and optionally acquires an item of content. In some cases, the user may simply sign in, having acquired the item of interest on a previous occasion. At step 204, the web interface adds the item, if newly acquired, to a list of items already owned by the user and available for download and displays that list to the user. If the item of interest was previously acquired, the list will include that previously acquired item. If no other items were previously purchased by the user, the list will contain just the sole acquired item. At step 206, the user provides input to the web interface, selecting an item from the list for download. At step 208, the web interface initiates the desired download. At step 210, a determination is made as to whether the console to which download is desired is in a receptive state, the meaning of "receptive" being discussed below. If and when the console is determined to be in a receptive state, the download of the item to the console automatically completes at step 212, without any input being required of the user. At step 214, the downloaded content may be installed and accessed and enjoyed by the user. The number of shaded steps involving active user input to achieve download may be compared with the corresponding shaded steps in FIG. 1 as indicative of the reduction in the demands on the user afforded by embodiments of the current invention.

The determination of when a console is in a receptive state will vary according to the design of the particular console and possibly according to particular services to which the user subscribes. In some cases, the console may have to be powered on but not currently playing any content. In some cases, the console may have to be in a designated "standby" mode. In some cases, the console may even have been powered off by the user, but be "awakened" at predetermined time intervals to a state in which the console checks whether any user-selected items are awaiting download. In some cases, the console may be powered off but "awakened" by the web interface whenever download is initiated by the web interface.

In some embodiments, the web interface may allow for cases where the user owns several different consoles, and wants the same item of content downloaded to more than one of these devices. In such cases, the web interface may accept input from the user selecting the various devices to which download is desired, and in response initiate download of the item to the all the selected devices.

In some cases, the web interface may allow for cases where the user owns several different consoles or gaming devices of more than one category. An example of such a category may be a standalone PlayStation gaming console or a portable PlayStation gaming device such as the PlayStation Vita. In such cases, the web interface may accept input from the user selecting the category of device to which download is desired, and in response initiate download of the item to all such devices registered to the user.

Figure 3:
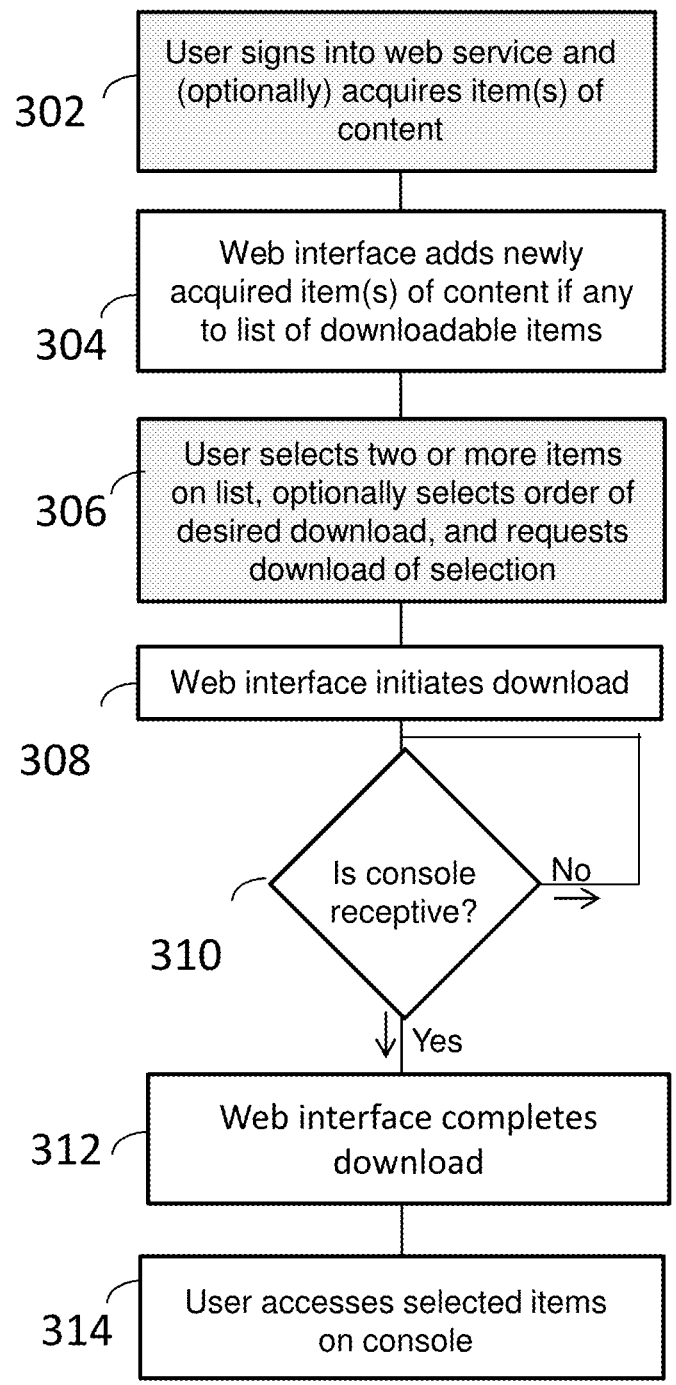
FIG. 3 is a flowchart illustrating the basic steps required to download and install content purchased online to a console, according to some embodiments of the current invention.

FIG. 3 is a flowchart illustrating the basic steps required to download and install content acquired online to a console according to some embodiments of the current invention, for cases where the user wishes to download more than one item of content to a console. At step 302, a user signs into a web service using a web interface and optionally acquires one or more items of content. In some cases, the user may simply sign in, having acquired the items of interest on a previous occasion from a web store or some other source. At step 304, the web interface adds the item or items, if newly acquired, to a list of items already owned by the user and available for download, and displays that list to the user. If no items are newly acquired, the list will include only previously acquired items. At step 306, the user provides input to the web interface, selecting two or more items from the list for download. In some cases, the user may also provide input determining the order in which download of the selected items is desired. At step 308 the web interface initiates the download of the selected items. At step 310, a determination is made as to whether the console to which download is desired is in a receptive state, as discussed above. If and when the console is determined to be in a receptive state, the download of the one or more items to the console automatically completes at step 312, without any input being required of the user. At step 314, the downloaded content may be installed and accessed and enjoyed by the user.

In cases where the order of download is deliberately selected by the user, the initiation of the downloads and the subsequent download processes will occur according to that selected order. In cases where no particular order is specified, the two or more items will generally be downloaded and installed in the order in which the user originally indicated their respective selection, so that the first item selected by the user will be downloaded first, the second, second, and so on.

Figure 4:
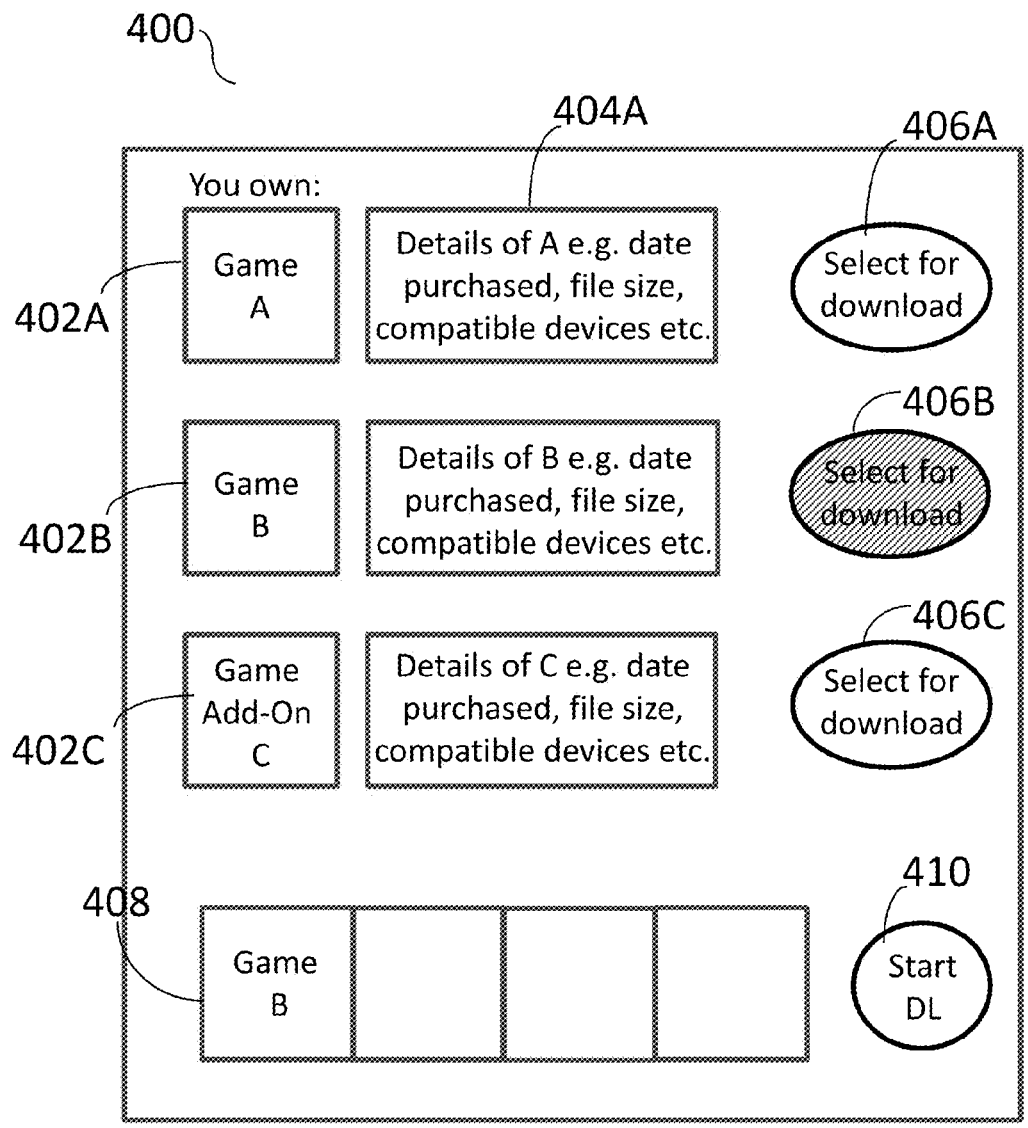
FIG. 4 shows a screen display of the web interface, according to some embodiments of the current invention.

FIG. 4 shows a screen display 400 of the web interface for some embodiments, at the point where the user has already successfully signed in, and is able to view all the items acquired to date. In the case shown, the user owns three items, Game A, Game B, and Game Add-On C listed in boxes 402A, 402B, 402C respectively. The column of boxes 404 (only the first shown explicitly labeled as 404A) adjacent to the 402 boxes shows details of the corresponding items, such as purchase date, file size, compatible playing devices etc. The right hand column of buttons 406A, 406B, 406C, allows the user to select corresponding items for download. In the case shown, the shading indicates that the user has selected Game B for download, and in response, the web interface shows a label Game B in the left-hand box of download queue 408. In some cases, the user may subsequently select Game A, resulting in the label Game A appearing in the adjacent box of download queue 408, indicating that the order in which the items will be downloaded is first Game B, then Game A. In some cases, button 410 allows the user to confirm that download should be initiated. In some cases, the user may be able to deselect an item using another button (not shown in the figure) or by dragging the corresponding label out of download queue 408, before activating button 410.

The same functionality achieved by the web interface using the screen display 400 operated as described above may be provided in many other ways, well known in the art. For example, rather than the user having to press a select button such as 406B, the user may have the option of simply highlighting box 402B, or of dragging the label from box 402B into a vacant box in download queue 408. The details of the arrangement and shape of boxes etc. simply provide one example by which the principles of operation may be understood.

In some embodiments, the web interface may allow for cases where the user owns several different consoles or devices, and wants the same one or more items of content downloaded to more than one of these consoles or devices. In such cases, the web interface may provide a display screen that accepts input from the user selecting the various devices to which download is desired, and in response initiate download of the selected items to all those devices. One way in which this functionality may be achieved is by presenting a display screen to the user that instead of a single "Select for download" button corresponding to each item of content, as shown in FIG. 4, several buttons are presented, one for each of the consoles or devices registered to the user. The order in which the items are downloaded may be a default "first selected, first downloaded" order, or in an order selected by the user, as discussed above.

Embodiments described herein provide various benefits. In particular, embodiments enable a user to conveniently arrange for download of one or more items of content in a desired order to one or more consoles, without having to carry out any actions at the console or consoles themselves. These benefits may be especially valuable to users acquiring items of content when located remotely from the console.

Figure 5:
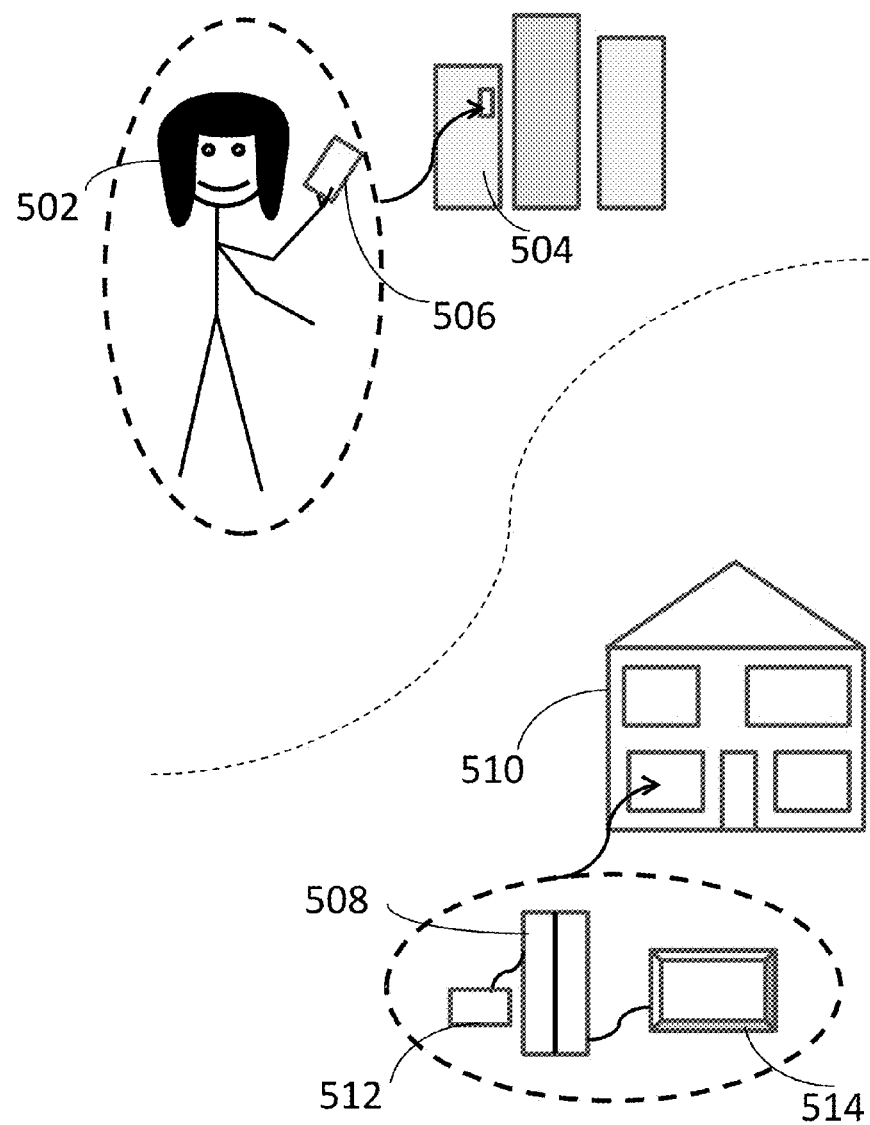
FIG. 5 shows a schematic illustration of how one embodiment of the current invention may be used.

FIG. 5 illustrates one example of such a situation, where an embodiment of the current invention allows user 502 situated in office building 504 to use a handheld computing device, such as smartphone or Tablet 506 to purchase or rent an item of content, and immediately thereafter request download of that item to console 508 located within a room of the user's home 510, located at some significant distance (indicated by the dashed line roughly bisecting the figure) from the user and the user's phone 506. FIG. 5 shows a typical configuration for a home system, with console 508 operatively connected to console controller 512 and display screen 514.

Although the description has been described with respect to particular embodiments thereof, these particular embodiments are merely illustrative, and not restrictive. Any suitable programming language can be used to implement the routines of particular embodiments including C, C++, Java, assembly language, etc. Different programming techniques can be employed such as procedural or object oriented. The routines can execute on a single processing device or multiple processors.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments can be achieved by any means known in the art. Distributed, networked systems, components, and/or circuits can be used. Communication or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in", "on", and "in close proximity to" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for remote download of content for consoles, the method comprising:
   providing a web interface to a user on a display screen of a computing device, wherein the web interface operates, in accordance with actions performed by the user, to:
   authenticate the user;
   display to the user a list of all items of content currently available for download by the user;
   accept input from the user selecting a first item of content from the list;
   in response to the selection of the first item, initiate download of the selected first item to a console registered to the user without requiring any user input after the selection of the first item; and determine whether the console is in a receptive state, wherein if the console is determined to be in a receptive state, download of the selected first item to the console is automatically completed without requiring any user input subsequent to the selection of the first item, and wherein if the console is determined to not be in a receptive state, determination of whether the console is in a receptive state is repeated until the console is determined to be in a receptive state, at which time download of the selected first item to the console is automatically completed without requiring any user input subsequent to the selection of the first item.

2. The method of claim 1, wherein the console is determined to be in a receptive state if the console is powered on and not currently playing other content.

3. The method of claim 1, wherein the web interface further operates to:
   after accepting input from the user selecting the first item of content from the list, accept input from the user selecting a category of console to which download of the first item is desired, without requiring any input from the user identifying an individual console either before or after the category is selected; and
   if a plurality of consoles of the selected category are registered to the user, initiate download of the first item to each of the remaining ones of the plurality of consoles.

4. The method of claim 3, additionally comprising automatically completing download of the first item to each of the remaining ones of the plurality of consoles of the selected category that is determined to be in a receptive state.

5. The method of claim 4, wherein each of the remaining ones of the plurality of consoles is determined to be in a receptive state if the corresponding console is powered on and not currently playing other content.

6. The method of claim 1, wherein the web interface further operates to:
   after accepting input from the user selecting the first item of content from the list, and before initiating download of the selected first item to the console, accept input from the user selecting a second item of content from the list; and
   after initiating download of the selected first item, initiate download of the selected second item to the console.

7. The method of claim 6, additionally comprising, if the console is determined to be in a receptive state, automatically completing download of the first and second items to the console.

8. The method of claim 7, wherein the console is determined to be in a receptive state if the console is powered on and not currently playing other content.

9. The method of claim 6, wherein the web interface further operates to:
   before initiating download of the first item, accept input from the user selecting a category of console to which download of the first and second items is desired; and
   if a plurality of consoles of the selected category are registered to the user, initiate download of the first item and then the second item to each of the remaining ones of the plurality of consoles.

10. The method of claim 9, additionally comprising automatically completing download of the first item and then the second item to each of the remaining ones of the plurality of consoles of the selected category that is determined to be in a receptive state.

11. The method of claim 10, wherein each of the remaining ones of the plurality of consoles is determined to be in a receptive state if the corresponding console is powered on and not currently playing other content.

12. The method of claim 1, wherein the web interface further operates to:
   after accepting input from the user selecting the first item of content from the list, and before initiating download of the selected first item to the console, accept input from the user selecting a second item of content from the list, and accept further input from the user selecting a desired order in which the first and second items are to be downloaded; and
   initiate download of the selected second item to the console, the order in which the downloads of the first and second items are initiated being determined according to the order selected by the user.

13. The method of claim 12, additionally comprising automatically completing download of the first and second items, in the order selected by the user, to the console, if the console is determined to be in a receptive state.

14. The method of claim 13, wherein the console is determined to be in a receptive state if the console is powered on and not currently playing other content.

15. The method of claim 1, wherein the console is determined to be in a receptive state if the console is in a designated "standby" mode.

16. The method of claim 1, wherein if the console has been powered off but is subsequently awakened at predetermined time intervals, and if at a wakened time during one of the predetermined time intervals it is found that a user-selected item is awaiting download, the console is determined to be in a receptive time at the wakened time.

17. A display screen of a computing device, the display screen presenting a visual display of elements operationally configured such that, on interaction with one or more of the elements by a user of the display screen:
   the user is authenticated;
   a list of all items of content currently available for download by the user is displayed to the user;
   input is accepted from the user selecting a first item of content from the list;
   in response to the selection of the first item, download of the selected first item is initiated to a console registered to the user without requiring any user input after the selection of the first item; and
   determine whether the console is in a receptive state, wherein if the console is determined to be in a receptive state, download of the selected first item to the console is automatically completed without requiring any user input other than the selection of the first item, and wherein if the console is determined to not be in a receptive state, receptive state, determination of whether the console is in a receptive state is repeated until the console is determined to be in a receptive state, at which time download of the selected first item to the console is automatically completed without requiring any user input subsequent to the selection of the first item.

18. The display screen of claim 17, wherein the console is determined to be in a receptive state if the console is powered on and not currently playing other content.

19. The display screen of claim 17, wherein the console is determined to be in a receptive state if the console is in a designated "standby" mode.

20. The display screen of claim 17, wherein if the console has been powered off but is subsequently awakened at predetermined time intervals, and if at a wakened time during one of the predetermined time intervals it is found that a user-selected item is awaiting download, the console is determined to be in a receptive time at the wakened time.

21. A non-transitory computer-readable storage device including one or more instructions executable by one or more processors for providing a web interface to a user on a display screen of a computing device, wherein the web interface operates, in accordance with actions performed by the user, to:
 authenticate the user;
 confirm the right of the user to download an item of content;
 accept a first input from the user indicating that download of the item to a console registered to the user is desired;
 in response to the accepted input, initiate download of the item to the console without requiring any user input other than the first input; and
 determine whether the console is in a receptive state, wherein if the console is determined to be in a receptive state, download of the item to the console is automatically completed without requiring any user input other than the first input, and wherein if the console is determined to not be in a receptive state, determination of whether the console is in a receptive state is repeated until the console is determined to be in a receptive state, at which time download of the selected first item to the console is automatically completed without requiring any user input subsequent to the selection of the first item.

* * * * *